(12) United States Patent
Sugizaki et al.

(10) Patent No.: US 8,847,140 B2
(45) Date of Patent: Sep. 30, 2014

(54) LIGHT RECEIVING CIRCUIT HAVING AN AUTOMATIC THRESHOLD CONTROL CIRCUIT FOR FORMING AND ALLOWING ELECTRIC CURRENT FLOWING BETWEEN A SECOND POTENTIAL LINE AND FIRST AND SECOND CONNECTION POINTS

(75) Inventors: Masayuki Sugizaki, Kanagawa-ken (JP); Shigeyuki Sakura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 203 days.

(21) Appl. No.: 13/605,800

(22) Filed: Sep. 6, 2012

(65) Prior Publication Data

US 2013/0234007 A1 Sep. 12, 2013

(30) Foreign Application Priority Data

Mar. 7, 2012 (JP) ................................. 2012-050189

(51) Int. Cl.
*H01J 40/14* (2006.01)

(52) U.S. Cl.
USPC ................................. 250/214 R; 250/214 LA

(58) Field of Classification Search
USPC ................ 250/214 R, 214.1, 214 A, 214 LA; 327/514, 515; 330/59
See application file for complete search history.

(56) References Cited

U.S. PATENT DOCUMENTS

| 5,805,641 | A | 9/1998 | Patel |
| 8,050,573 | B2 | 11/2011 | Zhang |
| 8,153,953 | B2 | 4/2012 | Sakamura et al. |
| 8,674,770 | B2 * | 3/2014 | Takiba et al. ................. 330/308 |
| 2013/0068935 | A1 | 3/2013 | Sakura |

FOREIGN PATENT DOCUMENTS

| EP | 0 718 991 A1 | 6/1996 |
| EP | 0 720 311 A2 | 7/1996 |
| EP | 1 032 145 A3 | 4/2002 |
| JP | 2005-210147 | 8/2005 |
| JP | 2007-005901 | 1/2007 |
| JP | 2011-216951 | 10/2011 |

\* cited by examiner

*Primary Examiner* — Que T Le
(74) *Attorney, Agent, or Firm* — Patterson & Sheridan, LLP

(57) ABSTRACT

A light receiving circuit includes a photodiode, a transimpedance amp having a feedback resistor, an electric current comparator and an automatic threshold control circuit that includes a current mirror circuit for forming a current according to the mirror effect. With this light receiving circuit, regardless of how powerful the input light signal is, low pulse width distortion characteristics can be achieved.

20 Claims, 7 Drawing Sheets

LIGHT RECEIVING CIRCUIT HAVING AN AUTOMATIC THRESHOLD CONTROL CIRCUIT FOR FORMING AND ALLOWING ELECTRIC CURRENT FLOWING BETWEEN A SECOND POTENTIAL LINE AND FIRST AND SECOND CONNECTION POINTS

CROSS-REFERENCE TO RELATED APPLICATION

This application is based upon and claims the benefit of priority from Japanese Patent Application No. 2012-050189, filed Mar. 07, 2012; the entire contents of which are incorporated herein by reference.

FIELD

Embodiments described herein relate to a light receiving circuit.

BACKGROUND

A conventional light receiving circuit has a photodiode and an electric current comparator including a CMOS circuit. In this conventional light receiving circuit, if the light input power is changed, the time for the switchover of the output of the electric current comparator will change. Because of this, a pulse width distortion (PWD) of the output signal will occur.

DETAILED DESCRIPTION

In general, according to one embodiment, an explanation will be given on the basis of the FIGS. in the following.

A light receiving circuit according to one or more embodiments is capable of decreasing the distortion of the output signal.

The light receiving circuit according to an embodiment is provided with a photodiode for photoelectric conversion of light signal into an electric signal, with one end connected to a first potential line and the other end connected to a first internal terminal. The light receiving circuit is further provided with a transimpedance amp having a feedback resistor connected between the first internal terminal and the second internal terminal, a first MOS transistor of a first electric conduction type with its gate connected to the first internal terminal and its drain connected to the second internal terminal, and a first constant electric current source for outputting the first constant electric current connected between the second internal terminal and a second potential line. The light receiving circuit is provided with an electric current comparator having a second MOS transistor of the first electric conduction type with its drain connected to an output terminal, its source connected to the first potential line, its gate connected to the second internal terminal, and a second constant electric current source for outputting the second constant electric current connected between the output terminal and the second potential line. The light receiving circuit is provided with a current mirror circuit that forms, according to the mirror effect, an electric current flowing between the second potential line and the first connection point, and allows the electric current to also flow between the second potential line and the second connection point connected to the output terminal. The light receiving circuit is provided with an automatic threshold control circuit having a third constant electric current source for the outputting the third constant electric current, with one end connected to the second potential line and the other end connected to the first connection point, and a third MOS transistor of the first electric conduction type, with its drain connected to the first connection point, its source connected to the first potential line, and its gate connected to the second internal terminal.

(Embodiment 1)

Figure 1:
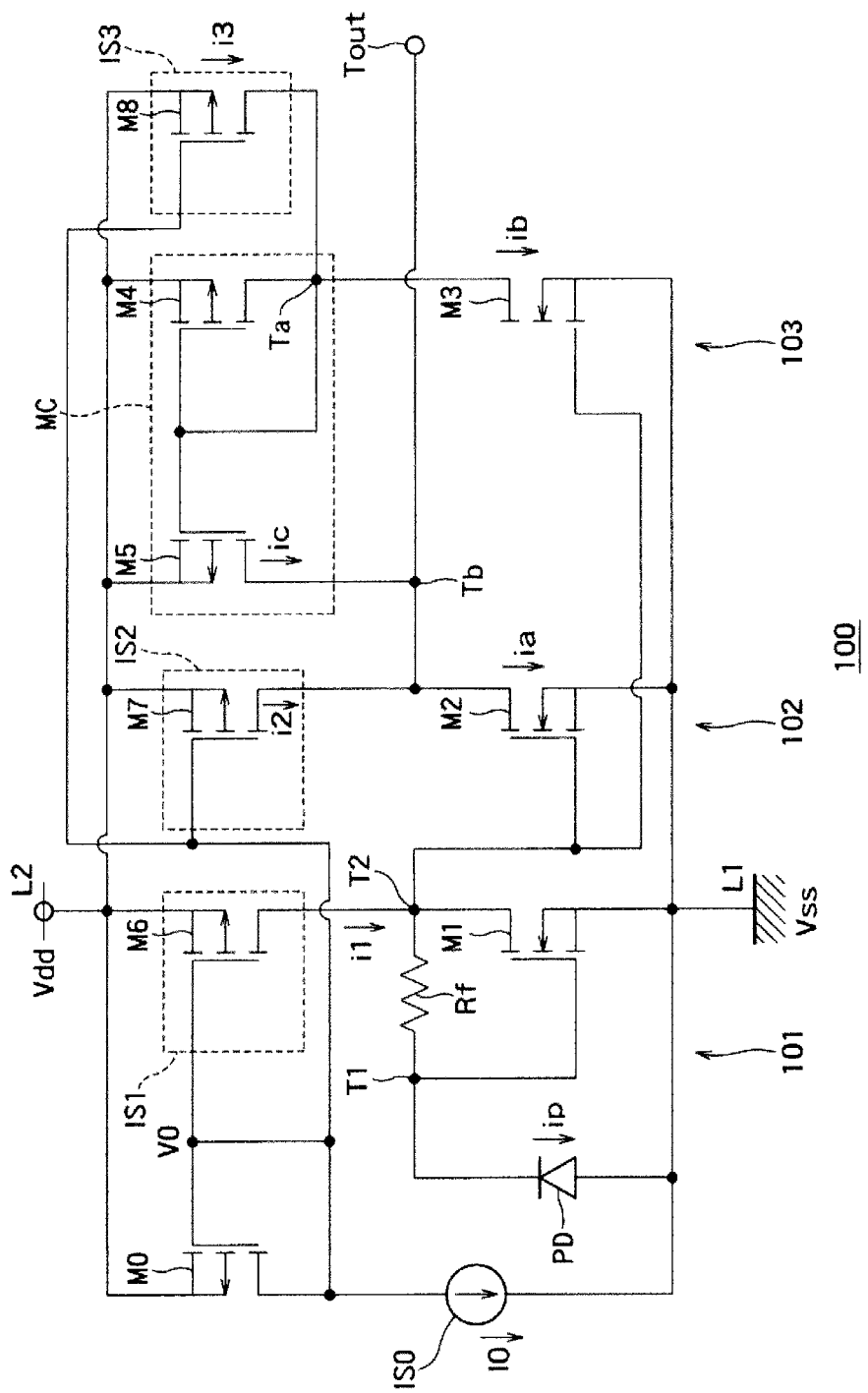
FIG. 1 is a circuit diagram showing an example of the constitution of the light receiving circuit according to the first embodiment.

FIG. 1 is a circuit diagram showing components of a light receiving circuit 100 according to the embodiment 1.

As shown in FIG. 1, the light receiving circuit 100 is provided with a photodiode PD, a transimpedance amp 101, an electric current comparator 102, an automatic threshold control ATC circuit 103, a reference MOS transistor of the second electric conduction type (p MOS transistor) M0, and a reference constant electric current source IS0.

The photodiode PD has one end (the anode) connected to a first potential line L1, and the other end (cathode) connected to a first internal terminal T1. To the first potential line L1, a ground voltage Vss is applied.

The photodiode PD performs photoelectric conversion of light signal into electric signal. In other words, for the photodiode PD, the magnitude of input electric current ip depends on the power of the light signal. For example, if the power of the light signal increases, the input electric current ip increases. On the other hand, if the power of the light signal decreases, the input electric current ip decreases.

Further, as shown in FIG. 1, the transimpedance amp 101 has a feedback resistor Rf, a first MOS transistor of a first electric conduction type (n MOS transistor) M1, and a first constant electric current source IS1. The feedback resistor Rf is connected between a first internal terminal T1 and a second internal terminal T2. The first MOS transistor M1 has its gate connected to the first internal terminal T1, and its drain connected to the second internal terminal T2.

The first constant electric current source IS1 is connected between the second internal terminal T2 and a second potential line L2, and is such that the first constant electric current i1 is outputted. To the second potential line L2, the electric source voltage Vdd is applied.

This first constant electric current source IS1 may be a MOS transistor, for example, a sixth MOS transistor of a second electric conduction type (p MOS transistor) M6. The sixth MOS transistor M6 has its source connected to the second potential line L2, its drain connected to the second internal terminal T2, and voltage V0 applied to its gate such that the first constant electric current i1 flows from its drain.

Furthermore, as shown in FIG. 1, the electric current comparator 102 has a second MOS transistor of the first electric conduction type M2, and a second constant electric current source IS2.

The second MOS transistor of the first electric conduction type M2 has its drain connected to an output terminal Tout, its source connected to the first potential line L1, and its gate connected to the second internal terminal T2. The size S2 of this second MOS transistor M2 is smaller than the size S1 of the first MOS transistor M1. That is, the gate length and the channel width of the second MOS transistor M2 are smaller than the gate length and the channel width of the first MOS transistor M1.

The second constant electric current source IS2 is connected between the output terminal Tout and the second potential line L2, and operates such that a second constant electric current i2 is outputted therefrom. The second constant electric current source IS2 may be a MOS transistor, for example, a seventh MOS transistor of the second electric conduction type (p MOS transistor) M7. The seventh MOS transistor M7 has its source connected to the second potential line L2, its drain connected to the output terminal Tout, and its gate connected to the gate of the sixth MOS transistor M6. The second constant electric current i2 flows in the seventh MOS transistor M7.

The electric current comparator 102 shown in FIG. 1 outputs a signal of "Low" level from the output terminal Tout when the electric current ia corresponding to the output electric current ip resulting from the photoelectric conversion of the light signal by the photodiode PD is above a threshold value (where the threshold value=the second constant electric current i2+mirror current ic). On the other hand, the electric current comparator 102 outputs a signal of "High" level from the output terminal Tout when the electric current ia is less than the threshold value.

Furthermore, as shown in FIG. 1, the automatic threshold control circuit 103 has a current mirror circuit MC, the third constant electric current source IS3, and a third MOS transistor of the first electric conduction type (n MOS transistor) M3.

A third constant electric current source IS3 has one end connected to the second potential line L2 and the other end connected to a first connection point Ta, so that a third constant electric current i3 is outputted.

This third constant electric current source IS3 may be a transistor, e.g., an eighth MOS transistor of the second electric conduction type (p MOS transistor) M8, having its source connected to the second potential line L2, its drain connected to the first connection point Ta, and its gate connected to the gate of the sixth MOS transistor M6.

The third MOS transistor M3 has its drain connected to the first connection point Ta, its source connected to the first potential line L1, and its gate connected to the second internal terminal T2 (the gate of the second MOS transistor M2).

The size S3 of this third MOS transistor M3 is the same as the size S2 of the second MOS transistor M2. In other words, the electric current ib flowing in the third MOS transistor M3 is equal to the electric current is flowing in the second MOS transistor M2.

Furthermore, the current mirror circuit MC forms electric current ic according to the mirror effect, the electric current ic flowing between the second potential line L2 and the first connection point Ta and being allowed to flow between the second potential line L2 and the second connection point Tb connected to the output terminal Tout.

The current mirror circuit MC has, for example, a fourth MOS transistor of the second electric conduction type (p MOS transistor) M4 and a fifth MOS transistor of the second electric conduction type (p MOS transistor) M5. The fourth MOS transistor M4 has its source connected to the second potential line L2, and its drain connected to the first connection point Ta, and is diode connected because its drain is connected to its gate. The fifth MOS transistor M5 has its source connected to the second potential line L2, its drain connected to the second connection point Tb, and its gate connected to the gate of the fourth MOS transistor M4.

As described above, the fourth MOS transistor M4 has its diode connected. Therefore, when the electric current ib is larger than the third constant electric current i3, the electric current flows in the fourth MOS transistor M4. On the other hand, in the case where the electric current ib is smaller than the third constant electric current i3, the electric current does not flow in the fourth MOS transistor M4.

Here, as already described, the third MOS transistor M3 is designed with the same size (i.e., the gate length and the channel width are the same) as M2, so that the electric current ib that is of the same size as the electric current is flows. In the drain of the third MOS transistor M3, the third constant electric current source IS3 is connected. Therefore, when the electric current ib is larger than the third constant electric current i3, the electric current is formed according to the mirror effect in the differential electric current (ib−i3) flows in the second connection point Tb.

Furthermore, as shown in FIG. 1, the reference MOS transistor M0 has its source connected to the second potential line L2, and its gate connected to the gate of the sixth MOS transistor M6, and is diode connected. In other words, the reference MOS transistor M0 and the sixth to eighth MOS transistor M6 to M8 constitute the so-called current mirror circuit.

The reference constant electric current source IS0 has one end connected to the drain of the reference MOS transistor M0 and the other end connected to the first potential line L1 so that a constant electric current I0 is outputted.

Therefore, for the first to third constant electric currents i1 to i3, the electric current flows as a result of the current formation according to the mirror effect of the constant electric current I0 flowing in the reference MOS transistor M0.

The light receiving circuit 100 shown in FIG. 1, when the electric current ia corresponding to the output electric current ip from the photoelectric conversion of the light signal by the photodiode PD is above the threshold value (which is equal to the second constant electric current source i2+the mirror current ic), outputs the signal of the "Low" level from the output terminal Tout. On the other hand, if the current ia is below the threshold value, the light receiving circuit 100 outputs the signal of the "High" level from the output terminal Tout.

Figure 2:
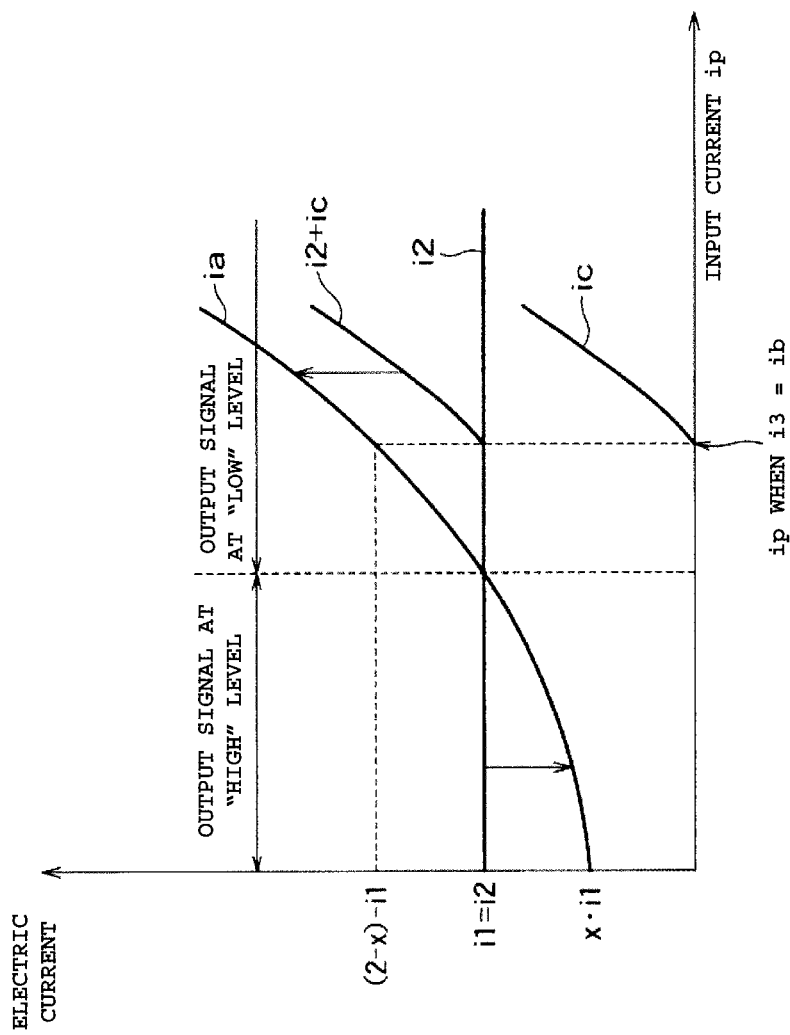
FIG. 2 is a diagram showing an example of the changes in the various electric currents with respect to the input electric current.
Figure 3:
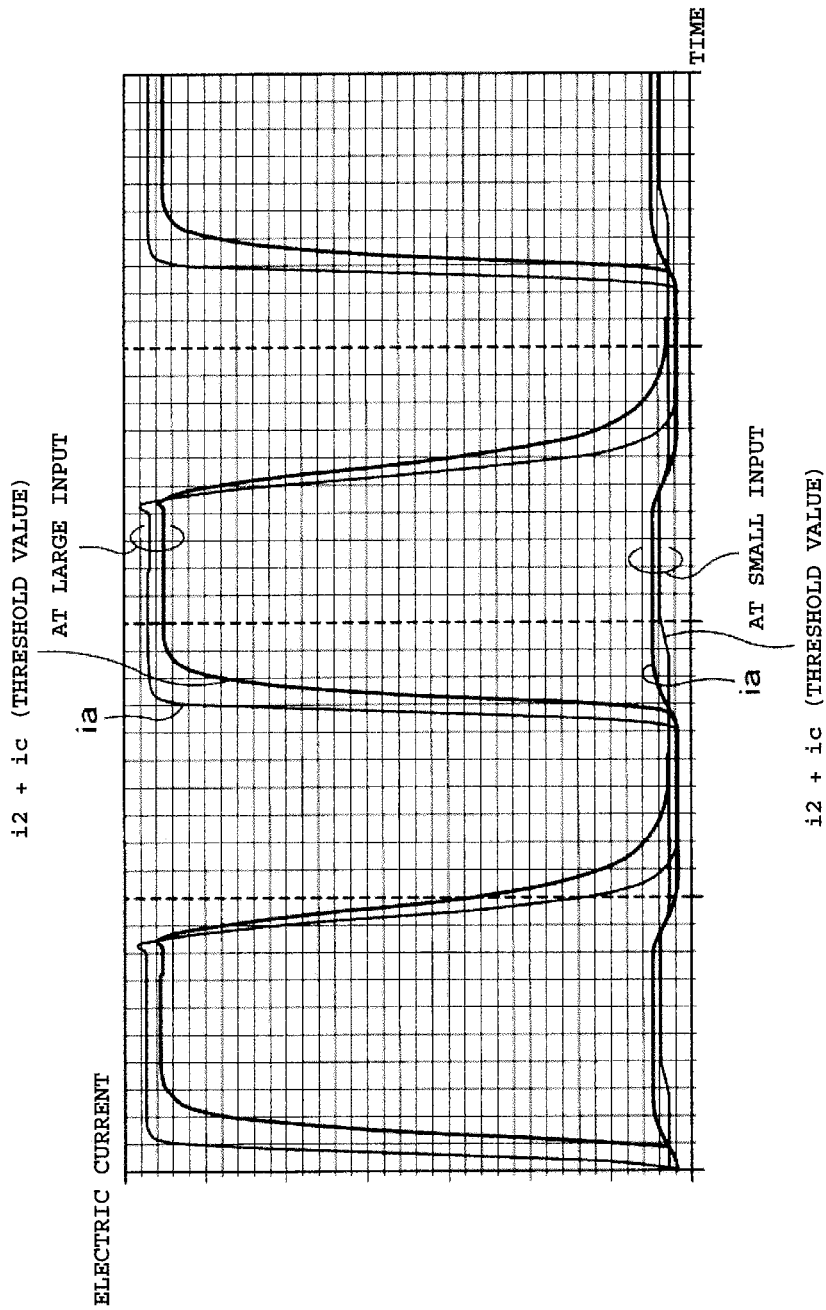
FIG. 3 is a diagram showing an example of the waveform of the electric current flowing in the electric current comparator shown in FIG. 1, and the waveform of the sum of the second constant electric current and the mirror current as the threshold value of the electric current comparator.
Figure 4:
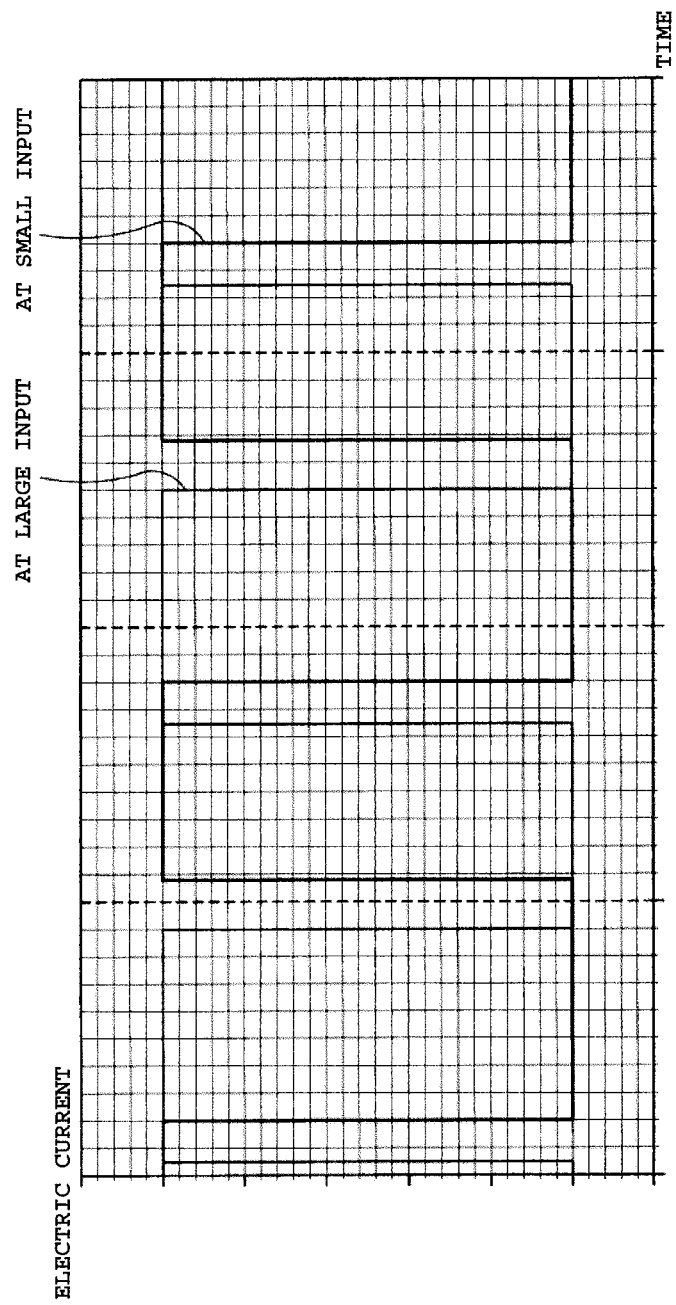
FIG. 4 is a diagram showing an example of the waveform of the output signal of the electric current comparator shown in FIG. 1, for the cases where the input electric current is a large input and a small input.

Next, an explanation will be given in regard to the operation of the light receiving circuit 100 shown in FIG. 1. FIG. 2 is a diagram showing an example of changes in various electric currents with respect to the input electric current ip. Furthermore, FIG. 3 is a waveform diagram showing an example waveform of the electric current ia flowing in the electric current comparator 102 shown in FIG. 1, and the waveform of the sum of the second constant electric current i2 and the mirror current is as the threshold value of the electric current comparator 102. Furthermore, FIG. 4 is a waveform diagram showing an example waveform of the output signal of the electric current comparator 102 shown in FIG. 1, in the cases where the input electric current ip is a large input and a small input.

Figure 5:
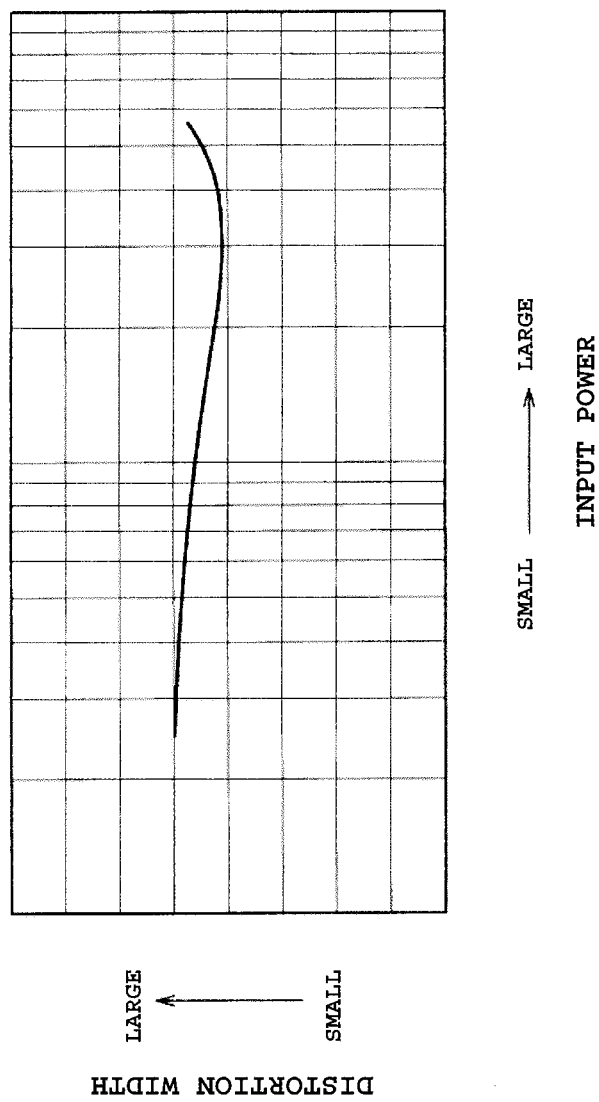
FIG. 5 is a diagram showing an example of the relationship between the pulse width distortion of the output signal of the electric current comparator shown in FIG. 1 and the input electric current.

Furthermore, FIG. 5 is a diagram showing an example of the relationship between the pulse width distortion of the output signal of the electric current comparator 102 shown in FIG. 1 and the input electric current ip.

As shown in FIG. 2, the electric current ia flowing in the second MOS transistor M2 of the electric current comparator 102 increases with an increase in the output electric current ip. When the input electric current ip is small (e.g., when the light input is small), the ia is smaller than the threshold value i2. In the course of increasing ip, the threshold value i2 is exceeded. M0 and M6 to M8 make up the current mirror circuit. Here, an explanation will be given for the case in which M6 and M7 are the same in size such that i1=i2. In order for ia to exceed the threshold value, the sizes of M1 and M2 are selected so that i1>ia (when ip is small) in view of the electric current error of the current mirror circuit. In FIG. 2, the ideal case when i1=i2 is shown. If the size ratio is x (=S2/S1), a value of 0.5 to 0.8 is expected from experience. Even in the case in which the sizes of M6 and M7 are different such that i1≠i2, the above equation i1>ia (when ip is small) still holds.

Here, the constant electric current i3 of the third constant electric current source IS3 is represented by (2−x) · i1. Still, x=S2/S1=S3/S1.

Therefore, the electric current i3, even if the output electric current ip is increased, does not flow unless the electric current ib (=electric current ia) is equal to the third constant electric current i3. The electric current ic increases at the same ratio as the electric current ia if the electric current ib (=electric current ia) is larger than the third constant electric current i3.

In doing so, the sum (the threshold value) of the second constant electric current i2 and the electric current ic will change in the manner shown in FIG. 2. The electric current comparator 102 outputs the output signal of the "Low" level to the output terminal Tout in the case in which the electric current ia is larger than this threshold value (i2 +ic). On the other hand, the output signal of the "High" level is outputted to the output terminal Tout in the case in which it is smaller than the threshold value (i2+ic).

Furthermore, as shown in FIG. 3, regardless of the size of the output electric current ip, the difference between the electric current (i2+ic) flowing in the electric current comparator 102 and the electric current is does not change. Therefore, the electric current (i2+ic) is a value equal to the threshold value without a signal.

In this way, as shown in FIG. 4, the switchover time for the output signal in the case of the inputting of the light signal is the same as the switchover time in the case of the interruption of the inputting of the light signal.

Therefore, as shown in FIG. 5, regardless of how powerful the light signal is, the low PWD characteristics can be achieved.

In the manner described above, with the light receiving circuit according to the present implementation embodiment, the distortion of the output signal can be decreased.
(Embodiment 2)

In this embodiment 2, in comparison to the embodiment 1 already described, an explanation will be given in regard to an example of the constitution in order to further stabilize the actions of the electric current comparator.

Figure 6:
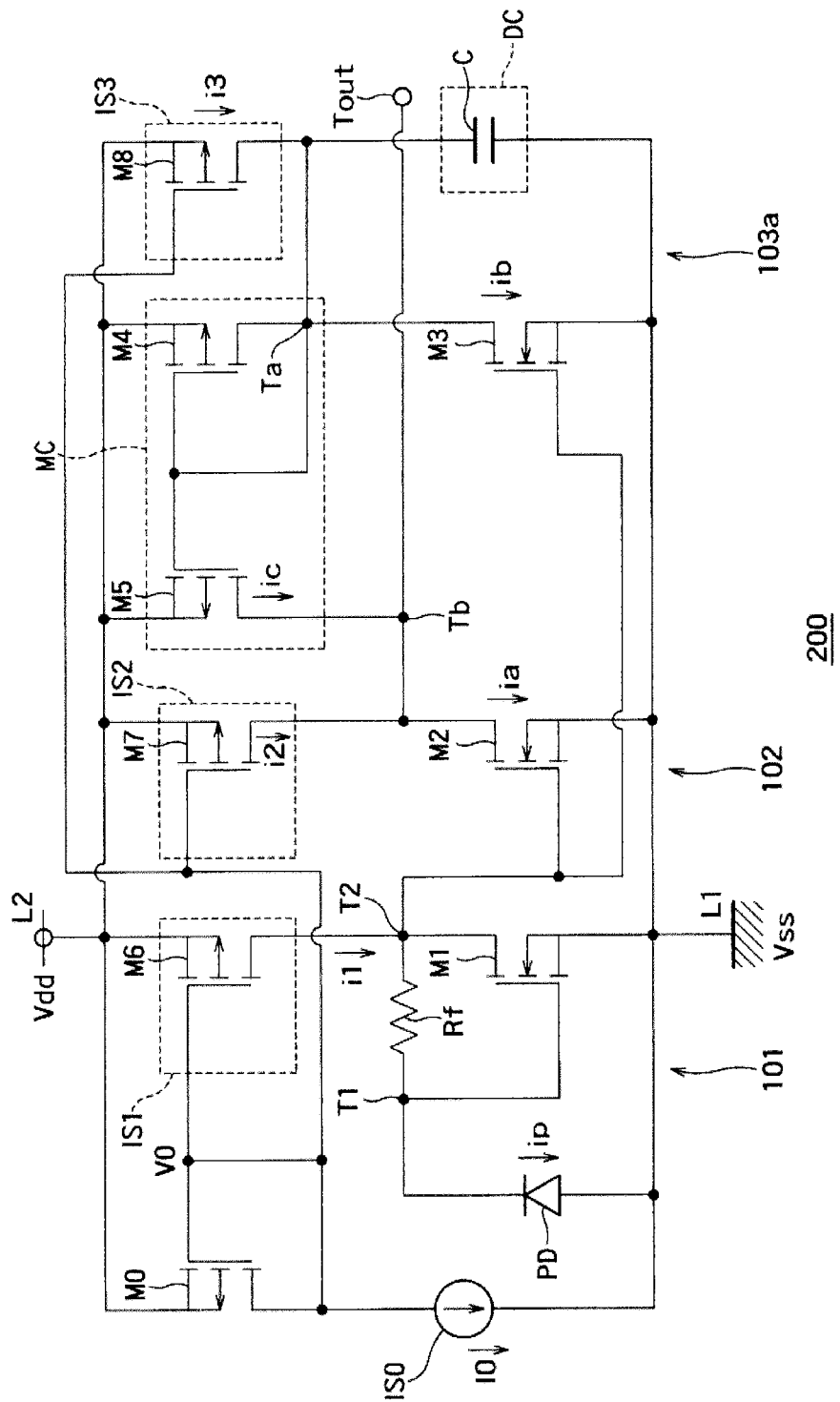
FIG. 6 is a circuit diagram showing an example of the constitution of the light receiving circuit according to the second embodiment.

FIG. 6 is a circuit diagram showing an example of the constitution of the light receiving circuit 200 according to the embodiment 2. In FIG. 6, the same symbols as those in FIG. 1 show the same constitution as the embodiment 1.

As shown in FIG. 6, this light receiving circuit 200 is provided with the photodiode PD, the transimpedance amp 101, the electric current comparator 102, the automatic threshold control circuit 103a, the reference MOS transistor of the second electric conduction type (p MOS transistor) M0, and the reference constant electric current source IS0.

Here, the automatic threshold control circuit 103a, compared to the automatic threshold control circuit 103 of the embodiment 1, is the delay circuit DC. This delay circuit DC is such that the electric current outputted to the first connection point Ta by the current mirror circuit MC is delayed. The delay circuit DC is, for example, the condenser C connected between the first connection point Ta and the first potential line L1.

With this delay circuit DC, since the electric current output to the first connection point Ta by the current mirror circuit MC is delayed, the current mirror current is output to the second connection point Tb by the current mirror circuit MC is also delayed.

As a result, the automatic threshold control circuit 103a, during the time in which the light input is off, when the electric current ia is decreased, can maintain the electric current is for a short time. In other words, for the electric current comparator 102, more stable comparator actions are possible.

The other constitution and functions of the light receiving circuit 200 are the same as those of the light receiving circuit 100 of the embodiment 1.

In other words, according to the light receiving circuit according to the present implementation embodiment, the actions of the electric current comparator are more stabilized, and the distortion of the output signals can be decreased.
(Embodiment 3)

In this embodiment 3, in comparison to the embodiment 1 already described, an explanation will be given regarding an example of the constitution capable of decreasing the electric current consumption.

Figure 7:
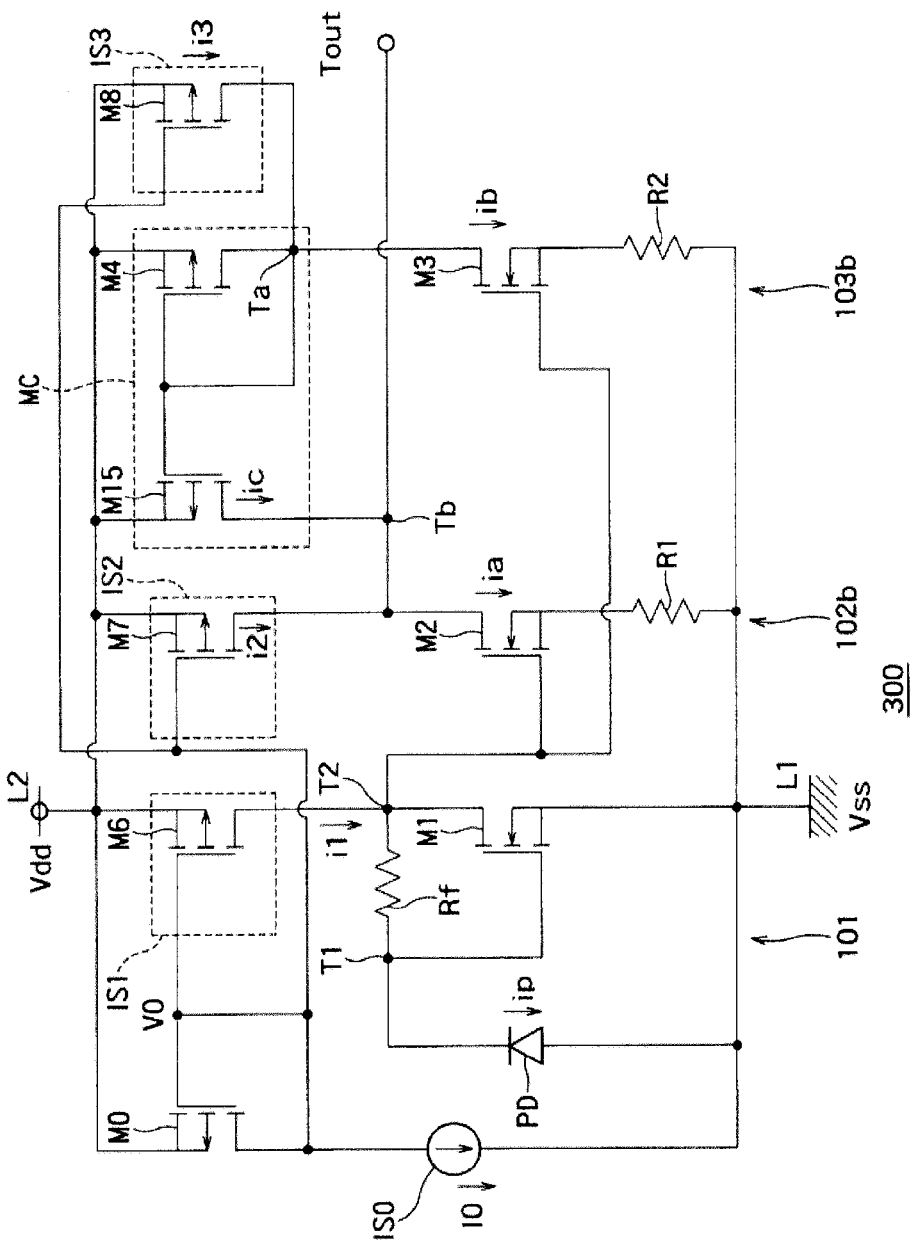
FIG. 7 is a circuit diagram showing an example of the constitution of the light receiving circuit according to the third embodiment.

FIG. 7 is a circuit diagram showing an example of the constitution of the light receiving circuit 300 according to the embodiment 3. In FIG. 7, the same symbols as those in FIG. 1 show the same constitution as the embodiment 1.

As shown in FIG. 7, this light receiving circuit 300 is provided with the photodiode PD, the transimpedance amp 101, the electric current comparator 102b, the automatic threshold control circuit 103b, the reference MOS transistor of the second electric conduction type (p MOS transistor) M0, and the reference constant electric current source IS0.

The electric current comparator 102b, compared to the electric current comparator 102 of the embodiment 1, has the first resistor R1 connected between the source of the second MOS transistor M2 and the first potential line L1.

Furthermore, the automatic threshold control circuit 103b, compared to the automatic threshold control circuit 103 of the embodiment 1, has the second resistor R2 connected between the source of the third MOS transistor M3 and the first potential line L1.

Here, for the MOS transistor, with respect to the increment of the input voltage between the gate and the source, the electric current increases in proportion to its square. Therefore, in the light receiving circuit 100 according to the embodiment 1 already described, if the input light is intensified, the electric current consumption increases generally in proportion to the square of its increment.

However, as in the light receiving circuit 300 according to the present implementation embodiment, by the insertion of the first and second resistances R1 and R2 between the source and the ground of the second and third MOS transistors M2 and M3, the electric current flowing in the second and third MOS transistors M2 and M3 will have characteristics close to the linear ones. As a result, the electric current consumption of the light receiving circuit 300 is moderated.

The other constitution and functions of this light receiving circuit 300 are the same as those of the light receiving circuit 1 of the embodiment 1.

In other words, with regard to the light receiving circuit according to the present implementation embodiment, while an increase in the electric current consumption is being moderated, the distortion of the output signals can be decreased.

In the implementation embodiments already described, an explanation has been given in regard to the case in which the first potential line is applied with the ground voltage, the second potential line is applied with the electric source voltage, the MOS transistor of the first electric conduction type is the n MOS transistor, the MOS transistor of the second electric conduction type is the p MOS transistor, and the photodiode has the anode connected to the first potential line and the cathode connected to the first internal terminal.

However, even if the polarity of the light receiving circuit is reversed, the same action effect can be achieved. In other words, it is also acceptable that the first potential line is applied with the electric source voltage, the second potential line is applied with the ground voltage, the MOS transistor of the first electric conduction type is the p MOS transistor, the MOS transistor of the second electric conduction type is the n MOS transistor, and the photodiode has the cathode connected to the first potential line and the anode connected to the first internal terminal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A light receiving circuit comprising:
   a photodiode for converting a light signal into an electric signal, having one end connected to a first potential line and the other end connected to a first internal terminal;
   a transimpedance amp having a feedback resistor with one end connected to the first internal terminal, a first MOS transistor of a first electric conduction type with a gate connected to the first internal terminal and a drain connected to a second internal terminal, and a first constant electric current source connected between the second internal terminal and a second potential line;
   an electric current comparator having a second MOS transistor of the first electric conduction type with a drain connected to an output terminal, a source connected to the first potential line, and a gate connected to the second internal terminal, and a second constant electric current source connected between the output terminal and the second potential line; and
   an automatic threshold control circuit having a current mirror circuit for forming an electric current flowing between the second potential line and a first connection point, and allowing an electric current to flow between the second potential line and a second connection point connected to the output terminal, a third constant electric current source with one end connected to the second potential line and the other end connected to the first connection point, and a third MOS transistor of the first electric conduction type with a drain connected to the first connection point, a source connected to the first potential line, and a gate connected to the second internal terminal.

2. The light receiving circuit according to claim 1, wherein the current mirror circuit comprises:
   a fourth MOS transistor of a second electric conduction type with a source connected to the second potential line, a drain connected to the first connection point, and a gate connected to the drain; and
   a fifth MOS transistor of the second electric conduction type with a source connected to the second potential line, a drain connected to the second connection point, and a gate connected to the gate of the fourth MOS transistor.

3. The light receiving circuit according to claim 1, wherein the automatic threshold control circuit further comprises a delay circuit for delaying the electric current that the current mirror circuit outputs to the first connection point.

4. The light receiving circuit according to claim 3, wherein the delay circuit is a condenser connected between the first connection point and the first potential line.

5. The light receiving circuit according to claim 1, wherein the electric current comparator further comprises a first resistor connected between the source of the second MOS transistor and the first potential line, and
   the automatic threshold control circuit further comprises a second resistor connected between the source of the third MOS transistor and the first potential line.

6. The light receiving circuit according to claim 1, wherein the first constant electric current source is a sixth MOS transistor of the second electric conduction type with a source connected to the second potential line, a drain connected to the second internal terminal, and a gate to which sufficient voltage is applied so that the first constant electric current flows therein;
   the second constant electric current source is a seventh MOS transistor of the second electric conduction type with a source connected to the second potential line, a drain connected to the output terminal, and a gate connected to the gate of the sixth MOS transistor; and
   the third constant electric current source is an eighth MOS transistor of the second electric conduction type with a source connected to the second potential line, a drain connected to the first connection point, and a gate connected to the gate of the sixth MOS transistor.

7. The light receiving circuit according to claim 6, further comprising:
   a reference MOS transistor of the second electric conduction type with a source connected to the second potential line, a gate connected to the gate of the sixth MOS transistor, and a drain connected to the gate; and
   a reference constant electric current source for outputting the constant electric current with one end connected to the drain of the reference MOS transistor and the other end connected to the first potential line.

8. The light receiving circuit according to claim 1, wherein the first potential line is applied with a ground voltage;
   the second potential line is applied with an electric source voltage;
   the first to third MOS transistors are nMOS transistors; and the photodiode has an anode connected to the first potential line and a cathode connected to the first internal terminal.

9. The light receiving circuit according to claim 1, wherein the current mirror circuit forms the electric current flowing between the second potential line and the first connection point according to the mirror effect.

10. A light receiving circuit comprising:
a photodiode having one end connected to a first potential line and the other end connected to a first internal terminal;
a transimpedance amp having a feedback resistor with one end connected to the first internal terminal, a first MOS transistor of a first electric conduction type with a gate connected to the first internal terminal and a drain connected to a second internal terminal, and a first constant electric current source connected between the second internal terminal and a second potential line;
an electric current comparator having a second MOS transistor of the first electric conduction type with a drain connected to an output terminal, a source connected to the first potential line, and a gate connected to the second internal terminal, and a second constant electric current source connected between the output terminal and the second potential line; and
an automatic threshold control circuit having a circuit for forming an electric current flowing between the second potential line and a first connection point and for allowing an electric current to flow between the second potential line and a second connection point connected to the output terminal, a third constant electric current source with one end connected to the second potential line and the other end connected to the first connection point, and a condenser having one end connected to the first connection point and the other end connected to the first potential line.

11. The light receiving circuit according to claim 10, wherein
the first constant electric current source is a third MOS transistor of a second electric conduction type with a source connected to the second potential line, a drain connected to the second internal terminal, and a gate to which sufficient voltage is applied so that the first constant electric current flows therein;
the second constant electric current source is a fourth MOS transistor of the second electric conduction type with a source connected to the second potential line, a drain connected to the output terminal, and a gate connected to the gate of the third MOS transistor; and
the third constant electric current source is a fifth MOS transistor of the second electric conduction type with a source connected to the second potential line, a drain connected to the first connection point, and a gate connected to the gate of the third MOS transistor.

12. The light receiving circuit according to claim 11, further comprising:
a reference MOS transistor of the second electric conduction type with a source connected to the second potential line, a gate connected to the gate of the third MOS transistor, and a drain connected to the gate; and
a reference constant electric current source for outputting the constant electric current with one end connected to the drain of the reference MOS transistor and the other end connected to the first potential line.

13. The light receiving circuit according to claim 10, wherein
the first potential line is applied with a ground voltage;

the second potential line is applied with an electric source voltage;
the first and second MOS transistors are nMOS transistors; and
the photodiode has an anode connected to the first potential line and a cathode connected to the first internal terminal.

14. The light receiving circuit according to claim 10, wherein the circuit for forming the electric current flowing between the second potential line and the first connection point and for allowing the electric current to flow between the second potential line and the second connection point connected to the output terminal comprises a current mirror circuit.

15. The light receiving circuit according to claim 10, wherein
the electric current comparator further comprises a first resistor connected between the source of the second MOS transistor and the first potential line.

16. A light receiving circuit comprising:
a photodiode having one end connected to a first potential line and the other end connected to a first internal terminal;
a transimpedance amp having a feedback resistor with one end connected to the first internal terminal, a first MOS transistor of a first electric conduction type with a gate connected to the first internal terminal and a drain connected to a second internal terminal, and a first constant electric current source connected between the second internal terminal and a second potential line;
an electric current comparator having a second MOS transistor of the first electric conduction type with a drain connected to an output terminal, a source connected to the first potential line, and a gate connected to the second internal terminal, and a second constant electric current source connected between the output terminal and the second potential line; and
an automatic threshold control circuit having a circuit for forming an electric current flowing between the second potential line and a first connection point and for allowing an electric current to flow between the second potential line and a second connection point connected to the output terminal, a third constant electric current source with one end connected to the second potential line and the other end connected to the first connection point, a third MOS transistor of the first electric conduction type with a drain connected to the first connection point, a source connected to the first potential line, and a gate connected to the second internal terminal, and a resistor connected between the source of the third MOS transistor and the first potential line.

17. The light receiving circuit according to claim 16, wherein
the first constant electric current source is a fourth MOS transistor of a second electric conduction type with a source connected to the second potential line, a drain connected to the second internal terminal, and a gate to which sufficient voltage is applied so that the first constant electric current flows therein;
the second constant electric current source is a fifth MOS transistor of the second electric conduction type with a source connected to the second potential line, a drain connected to the output terminal, and a gate connected to the gate of the fourth MOS transistor; and
the third constant electric current source is a sixth MOS transistor of the second electric conduction type with a source connected to the second potential line, a drain connected to the first connection point, and a gate connected to the gate of the fourth MOS transistor.

18. The light receiving circuit according to claim 17, further comprising:
- a reference MOS transistor of the second electric conduction type with a source connected to the second potential line, agate connected to the gate of the fourth MOS transistor, and a drain connected to the gate; and
- a reference constant electric current source for outputting the constant electric current with one end connected to the drain of the reference MOS transistor and the other end connected to the first potential line.

19. The light receiving circuit according to claim 18, wherein
- the first potential line is applied with a ground voltage;
- the second potential line is applied with an electric source voltage;
- the first to third MOS transistors are nMOS transistors; and
- the photodiode has an anode connected to the first potential line and a cathode connected to the first internal terminal.

20. The light receiving circuit according claim 16, wherein the circuit for forming the electric current flowing between the second potential line and the first connection point and for allowing the electric current to flow between the second potential line and the second connection point connected to the output terminal comprises a current mirror circuit.

* * * * *